United States Patent
Tschida et al.

(10) Patent No.: US 10,480,688 B2
(45) Date of Patent: Nov. 19, 2019

(54) HIGH STRENGTH SINGLE PIECE CABLE TIE LOCKING MECHANISM

(71) Applicant: ABB Schweiz AG, Baden (CH)

(72) Inventors: Colin Tschida, Durham, NC (US); Kathryn F. Murphy, Raleigh, NC (US); Gaurav Dave, Raleigh, NC (US)

(73) Assignee: ABB Schweiz AG, Baden (CH)

(*) Notice: Subject to any disclaimer, the term of this patent is extended or adjusted under 35 U.S.C. 154(b) by 50 days.

(21) Appl. No.: 15/811,149

(22) Filed: Nov. 13, 2017

(65) Prior Publication Data

US 2018/0135780 A1    May 17, 2018

Related U.S. Application Data (60) Provisional application No. 62/421,654, filed on Nov. 14, 2016.

(51) Int. Cl.
 *F16L 3/233* (2006.01)
 *B65D 63/10* (2006.01)

(52) U.S. Cl.
 CPC ........ *F16L 3/2334* (2013.01); *B65D 63/1045* (2013.01); *B65D 63/1072* (2013.01)

(58) Field of Classification Search
 CPC .. F16L 3/2332; F16L 3/2336; B65D 63/1063; B65D 63/1027; B65D 63/1072
 USPC ...................................................... 24/16 PB
 See application file for complete search history.

(56) References Cited

U.S. PATENT DOCUMENTS

| | | |
|---|---|---|
| 3,368,247 A | 2/1968 | Orban |
| 3,660,869 A | 5/1972 | Caveney et al. |
| 5,146,654 A * | 9/1992 | Caveney ............. B29C 45/0053 24/16 PB |
| 5,642,554 A | 7/1997 | Sorensen et al. |
| 5,675,870 A | 10/1997 | Cooper |
| 5,722,123 A | 3/1998 | Davignon et al. |
| 5,956,813 A | 9/1999 | Cooper |
| 6,185,792 B1 | 2/2001 | Nelson et al. |
| 6,347,434 B1 * | 2/2002 | Newman ............. B65D 63/1063 24/16 PB |
| 6,526,628 B1 * | 3/2003 | Caveney ............. B65D 63/1036 24/16 PB |
| 7,017,237 B2 | 3/2006 | Magno, Jr. et al. |
| 7,730,592 B2 | 6/2010 | Kissel |
| 9,038,246 B2 | 5/2015 | Liang |
| 9,061,807 B2 | 6/2015 | Drane et al. |

(Continued)

OTHER PUBLICATIONS

Specification and drawings of Application No. PCT/US16/27509 filed Apr. 14, 2016.

*Primary Examiner* — Robert Sandy
(74) *Attorney, Agent, or Firm* — Taft Stettinius & Hollister LLP; J. Bruce Schelkopf (57) ABSTRACT

A cable tie includes a flexible elongate strap and a head attached to a first end of the strap. The head has a front wall, side walls and a rear wall defining an aperture. The front wall has at least one fixed tooth formed thereon and the rear wall has a flexural element formed thereon opposite the at least one fixed tooth, wherein the at least one fixed tooth and the flexural element are configured to permit a second end of the strap opposite the head to be inserted through the head aperture in a first direction and being further configured to prevent movement of the second end of the strap from the head aperture in a second direction opposite the first direction.

13 Claims, 4 Drawing Sheets

(56) References Cited

U.S. PATENT DOCUMENTS 9,188,249 B2 * 11/2015 Owen ................ B65D 63/1081
2014/0223696 A1 8/2014 O'Regan et al.

* cited by examiner

HIGH STRENGTH SINGLE PIECE CABLE TIE LOCKING MECHANISM

CROSS-REFERENCE TO RELATED APPLICATIONS

This application claims priority from U.S. provisional application Ser. No. 62/421,654, filed on Nov. 14, 2016, the specification of which is incorporated herein in its entirety for all purposes.

TECHNICAL FIELD

The present invention relates to cable ties having improved mechanical strength. More particularly, the present invention is directed to cable ties employing a fixed teeth locking mechanism.

BACKGROUND

A cable tie or tie-wrap, also known as a hose tie, zap-strap or zip tie, is a type of fastener for holding items together, such as electric cables or wires. Because of their low cost and ease of use, tie-wraps are ubiquitous, finding use in a wide range of other applications. Stainless steel versions, either naked or coated with a rugged plastic, cater for exterior applications and hazardous environments.

The common tie-wrap, normally made of nylon, has a tape section with teeth that engages with a pawl in the head to form a ratchet so that, as the free end of the tape section is pulled, the tie-wrap tightens and does not come undone. Another version of the tie-wrap allows a tab to be depressed to either adjust the tension or remove the tie-wrap. Another popular design of the cable tie locking mechanism involves a metallic barb in the head slot. The metallic, e.g. stainless steel, barb is inserted after the plastic part is molded. The barb engages and cuts into the strap surface to lock the strap in place when fastened.

Another prior-art design of a tie-wrap is assembled from a plastic strap component and a double lock head component. The plastic strap is extruded continuously. The double lock head has two slots with a metal barb in each slot to lock the plastic strap inserted into the head. The plastic material in this design is typically acetal.

A typical requirement for cable ties, in addition to, for example, chemical resistance to common automotive fluids, is that a fastened cable tie should withstand prolonged exposure to elevated temperatures, (e.g. at 125° C.), if it is to be applied, for example, in or in the vicinity of the engine compartment. At the same time, such a cable tie should show good mechanical strength at low, (e.g. sub-zero), temperatures. For such high-end applications, cable ties are often molded from a polyamide composition, (e.g. a plasticized polyamide 11 composition, an elastomer-modified polyamide 66 composition, etc.). Acetal material is also used to extrude cable tie straps and injection mold cable tie heads separately due to its relatively inferior processability.

A drawback of conventional nylon cable ties is that they do not fulfill all these requirements simultaneously and, especially, do not show enough strength and impact resistance at temperatures down to −35° C. This means that various cable ties of different designs and/or made from different thermoplastic compositions need to be used for assembling an electrical harness and mounting it in various diverse environments. This concurrent use of different types of cable ties is disadvantageous from logistical, manufacturing, and economical points of view.

A cable tie has two typical failure mechanisms. First, the cable tie strap can break when the fastening load is beyond the material strength limit. Another failure mechanism involves the unlocking of the strap from the cable tie head slot, whether the cable tie uses a plastic pawl or a metallic barb. Both failure mechanisms can cause a cable tie to fail before reaching its designated loop tensile strength rating. These failure methods are also how the tie can fail above its rated load.

Since the original invention of the cable tie in 1958, many follow-up patents have emerged that mainly focus on improved manufacturing methods, new materials, or special applications. More recent patents directed to the problem of insufficient strength at different temperatures focus on reinforcing of the polymer matrix with graphene.

Another prior art method of reinforcement involves introducing strengthening fibers into the raw plastic material prior to molding the cable tie. It has also been proposed in commonly owned PCT Application No. PCT/US16/27509 to provide a reinforced cable tie with a continuous fiber roving throughout the whole body. Such glass fiber reinforced cable ties have much higher strap strength than unreinforced, but an ultra-strong locking mechanism is needed in order to fully take advantage of the increased strap strength. Moreover, a suitable locking mechanism cannot involve parts which may dig into the strap and cut the fibers, such as a metallic barb.

Many solutions to the problem of cable tie locking exist. Some involve multi-part locking mechanisms, while others are of a single piece with the cable tie strap. For example, some cable ties utilize a ratcheting pawl to lock a serrated plastic strap. In other cases, a metallic barb is used to lock a plastic strap. It is also known to use a fiberglass pin to lock a plastic strap or a ball or balls to lock a steel strap. However, none of these prior art approaches are specialized for fiber-reinforced cable ties.

Accordingly, it would be desirable to provide a simple, inexpensive locking mechanism for fiber reinforced cable ties. It would be further desirable to provide a simple, inexpensive locking mechanism which can be injection molded and match the ultimate strength of the fiber-reinforced tie without significant change to the form factor of the un-reinforced product.

SUMMARY

In one aspect of the present invention, a cable tie includes a flexible elongate strap and a head attached to a first end of the strap. The head has a front wall, side walls and a rear wall defining an aperture. The front wall has at least one fixed tooth formed thereon and the rear wall has a flexural element formed thereon opposite the at least one fixed tooth, wherein the at least one fixed tooth and the flexural element are configured to permit a second end of the strap opposite the head to be inserted through the head aperture in a first direction and being further configured to prevent movement of the second end of the strap from the head aperture in a second direction opposite the first direction.

The flexural element may be toothless and may take the shape of a beam or plate that is pivotably attached to the rear wall about a living hinge integrally formed on the rear wall.

The head further preferably includes at least one stop projecting into the aperture for preventing the strap from disengaging from the at least one tooth formed in the head. The at least one stop engages either the strap or the flexural element.

The flexural element may be a solid projection from the head which prevents the free end of the strap from being pushed away from the at least one tooth. Alternatively, the flexural element may be a leaf spring made from a material that is different than the material of the cable tie.

The head may be molded separately from the strap and attached either during manufacturing or by the user. The cable tie may also be molded with a continuous fiber reinforcement within at least one of the strap and the head. The continuous fiber reinforcement may be disposed continuously along a specific load path of at least one of the strap and the head.

In another aspect, the cable tie includes an elongate strap and a head attached to the first end of the strap, wherein the head includes a front wall, side walls and a rear wall defining an aperture having an entrance and an exit. The front wall has at least one fixed tooth formed thereon and the rear wall has a first stop formed at the entrance of the aperture and a second stop formed at the exit of the aperture, wherein the at least one fixed tooth and the first and second stops are configured to permit a second end of the strap opposite the head to be inserted through the head aperture in a first direction and being further configured to prevent movement of the second end of the strap from the head aperture in a second direction opposite the first direction.

In this embodiment, the first and second stops prevent the strap from disengaging with at least one tooth by bending the strap about the first stop at the entrance of the aperture while a finite bending radius of the strap keeps the at least one tooth engaged.

The present invention provides substantial business benefits. The invention is a new type of locking mechanism for plastic cable ties. It consists of a set of fixed teeth and a feature which pushes a serrated strap into the teeth. This accomplishes the same function as a standard one-piece cable tie, which has the teeth on a cantilevered beam. However, the new design reduces stress concentrations such that the cable tie is significantly stronger without any change of materials or added cost.

The cable tie of the present invention can be applied in all markets in which plastic cable ties are currently used. This invention may also be applied to markets which are currently served by higher strength cable ties manufactured from multiple materials.

Features of the disclosure will become apparent from the following detailed description considered in conjunction with the accompanying drawings. It is to be understood, however, that the drawings are designed as an illustration only and not as a definition of the limits of this disclosure.

BRIEF DESCRIPTION OF THE DRAWINGS

The following figures form part of the present specification and are included to further demonstrate certain aspects of the present claimed subject matter. The present claimed subject matter may be better understood by reference to one or more of these drawings in combination with the description of embodiments presented herein. Consequently, a more complete understanding of the present embodiments and further features and advantages thereof may be acquired by referring to the following description taken in conjunction with the accompanying drawings, in which like reference numerals may identify like elements, wherein:

DETAILED DESCRIPTION OF PREFERRED EMBODIMENTS

Figures 1, 1A:
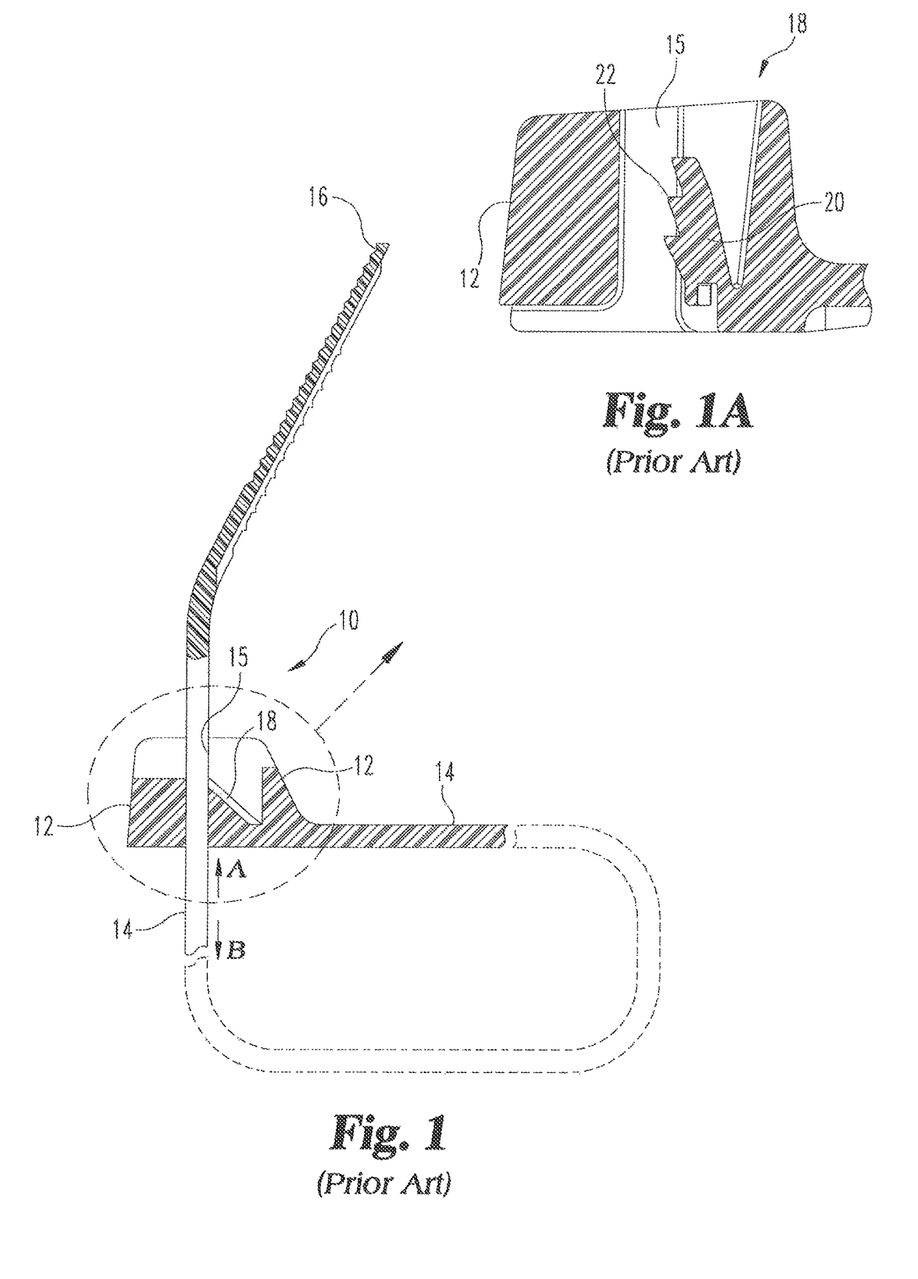
FIG. 1 shows, in section, an exemplary cable tie of the prior art, having a head containing an aperture and locking mechanism and an extending strap, with the strap inserted into the head.
FIG. 1a is an enlarged isolated cross-sectional view of the locking mechanism shown in FIG. 1.

Referring first to FIG. 1, a cable tie 10 of the prior art is shown for reference. The cable tie 10 of the prior art is typically an elongate molded plastic member, which is used in a manner described above to wrap around a bundle of articles (not shown). The cable tie 10 is typically made from a plastic composition and includes a head 12 at one end thereof, a tail 16 at the other end of the head and a generally planar strap 14 therebetween. In the illustrative embodiment provided, the head 12 is formed as an integral portion of the cable tie 10. However, in certain applications the cable tie 10 may be constructed in a manner where the head 12 is formed separately from the strap 14.

The head 12 of the cable tie 10 includes an aperture 15 therethrough (shown with the strap 14 therein) for insertably accommodating the tail 16 and passage of the strap 14 therein in a first direction "A". The head 12 of cable tie 10 typically includes a locking device 18 supported by the head 12 and extending into the aperture. The locking device 18 permits insertion of the strap 14 in the first direction "A" and prevents substantial movement of the strap 14 in a second direction "B" opposite the first direction upon an attempt to withdraw the strap 14 from the aperture.

As shown in FIG. 1a, the locking device 18 is typically an integrally formed plastic pawl 20, such as is disclosed in U.S. Pat. No. 7,017,237. This pawl 20 is connected to the head 12 about a pivot point so as to be flexible within the aperture 15. The pawl 20 further includes at least one tooth 22 facing the aperture 15 for engagement with serrations or other teeth provided on the strap 14. The flexibility of the pawl 20 within the aperture 15 of the head 12 allows insertion of the strap 14 within the aperture 15, but resists the withdrawal of the strap under load due to the engagement of the teeth.

However, these dual functions of the flexible pawl 20 are in direct competition. Specifically, the pawl 20 must be flexible enough to allow insertion in one direction, but also rigid and strong enough to bear the rated load in the opposite direction. This results in a reduced area to resist the imposed forces, creating a weak point.

Figure 2:
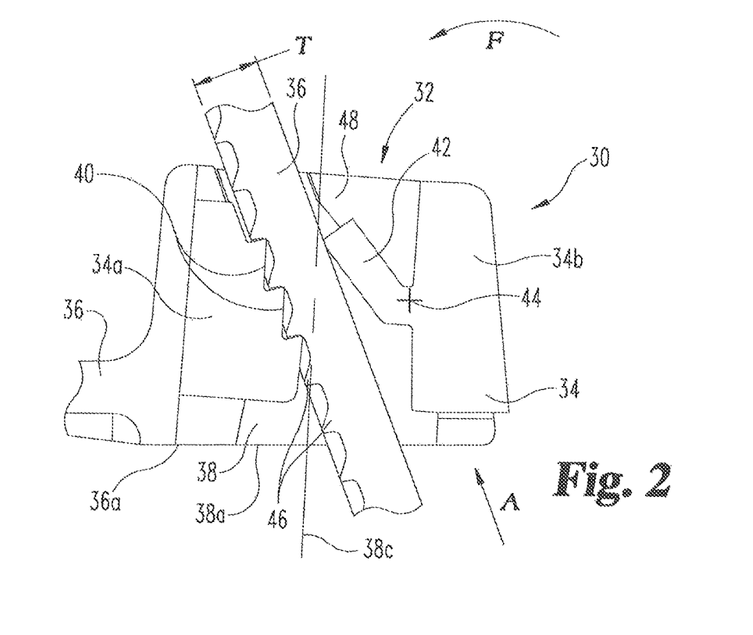
FIG. 2 is an enlarged isolated cross-sectional view of a locking mechanism formed in accordance with the present invention.
Figure 3:
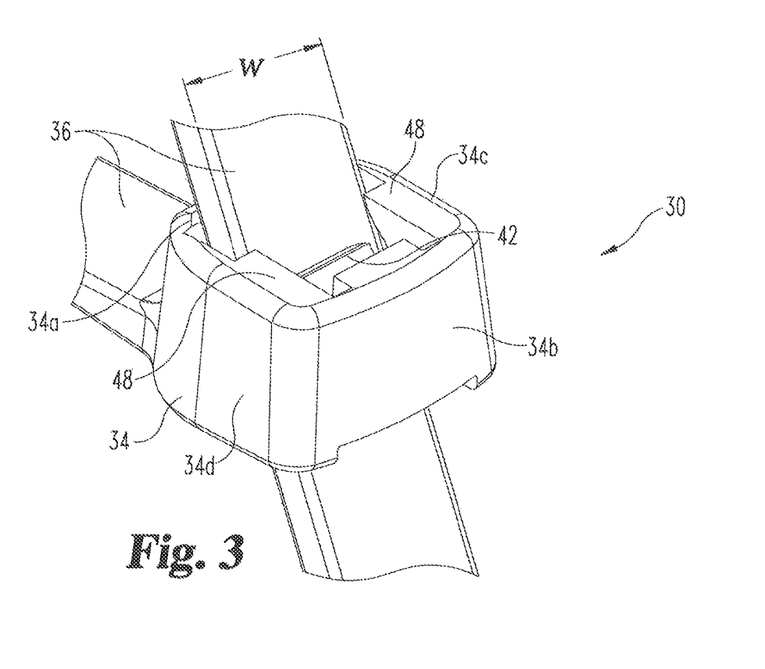
FIG. 3 is a top perspective view of the cable tie shown in FIG. 2.

Turning now to FIGS. 2 and 3, the present invention provides a cable tie 30 with a locking device 32 that is strengthened by separating the "teeth" from the flexural element. The cable tie 30 of the present invention is similar in several respects to the prior art cable tie 10 described above. Specifically, the cable tie 30 includes a head 34 at one end thereof, a tail (not shown) at the other end of the head and a generally planar strap 36 therebetween. The head 34 of the cable tie 30 includes an aperture 38 having the locking device 32 of the present invention. Similar to locking devices of the prior art, the locking device 32 of the present invention permits insertion of the strap 36 in one direction, but prevents removal of the strap in the opposite direction.

However, the locking device 32 of the present invention includes a head 34 with integrally formed fixed teeth 40 formed on one side of the aperture 38 and a flexural element 42 formed on the other side of the aperture opposite the teeth 40. As will be discussed in further detail below, the flexural element 42 is pivotable about an integrally formed pivot point 44 of the head 34 so as to provide a biasing force against the strap 36 to urge the serrations 46 formed on the strap into engagement with the teeth 40 formed in the head.

With this design, it can be appreciated that the serrations 46 of the strap 36 will be provided on the opposite surface of the strap as compared with most prior art cable ties. Specifically, the serrations 46 of the strap 36 are formed on the surface 36a of the strap 36 that is immediately adjacent the strap insertion end 38a of the aperture 38. In other words, the serrations 46 are formed on the surface 36a that will contact the articles to be tied together by the cable tie when the cable tie is formed into a loop to encircle the articles and tie them together.

In this regard, the fixed teeth 40 formed in the head 34 have edges that are pointed away from the strap insertion end 38a of the aperture 38 and the serrations 46 of the strap 36 are preferably formed as sharp "ratchet" teeth with points facing away from the distal tail of the strap. The space between any two adjacent strap teeth of the strap 36 matches the spacing between the teeth 40 of the head 36 so that a recess between any adjacent two teeth of the head 34 will receive a tooth of the strap 36.

As also shown in FIG. 2, the flexural element 42 extends from its pivot point 44 in a direction away from the strap insertion end 38a of the aperture 38. This configuration allows insertion of the strap 36 into the strap insertion end 38a of the aperture 38 in a first direction A and resists withdrawal of the strap in the opposite direction.

The flexural element 42 is preferably a singly-supported beam or plate of any shape that pushes the strap into the teeth 40. Thus, the teeth 40 resist the load while the flexure of the flexural element 42 is only used to index the strap.

The body portion of the strap 36 has two opposite short sides extending between the inner surface 36a and outer surface of the strap such as to provide the body portion with a substantially rectangular cross section. The width of each short side, in other words, the distance from the inner surface 36a and the opposite outer surface of the strap 36, which may also be described as the thickness of the body portion of the strap, is denoted T in FIG. 2.

As also shown in FIG. 3, the head 34 has a perimeter wall, which may be understood to be formed of front wall 34a, rear wall 34b, and side walls 34c, 34d. The perimeter wall surrounds the aperture 38, which extends from the bottom of the head at the strap insertion end 38a to the top of the head at an exit, as shown in FIG. 2. Thus, the flexural element 42 is hinged to the back wall 34a about its pivot point 44 and extends into the aperture 38 in an angled direction toward the front wall 34a and toward the exit of the aperture. The fixed teeth 40 of the head 34 are formed on the front wall 34a with points extending into the aperture in an angled direction toward the front wall 34a and the exit of the aperture. As shown in FIG. 2, the front wall 34a is formed with three teeth, but according to other embodiments, the front wall may have a smaller or larger number of teeth.

Also, FIG. 2 shows the individual teeth 40 of the head being offset from one another with respect to the centerline 38c of the aperture 38. In other words, each tooth following the tooth closest to the strap insertion end 38a of the aperture 38 in the direction A is respectively spaced a distance away from the centerline 38c of the aperture. This spacing can be selected so that the points of the teeth fall in a line disposed at an angle that substantially matches the angle of the flexural element 42 with respect to the centerline 38c of the aperture.

The preferred angle is a compromise between moldability, flexure contact and, in part, may depend on the number of teeth. The preferred angle of the flexural element 42 with respect to the centerline 38c of the aperture would be an angle chosen to provide draft for molding and contact of the active components. In other embodiments, the teeth can be formed so that their points fall in a line substantially parallel with the centerline 38c of the aperture.

The teeth 40 and the distal end of the flexural element 42 define a space therebetween having a dimension slightly less than the thickness T of the strap 36. This will ensure that the strap 36 is in constant contact with both the teeth 40 and the flexural element 42.

The hinge forming the pivot point 44 of the flexural element 42 is configured so that, when one or more of the head teeth 40 are engaged with one or more of the strap teeth 46, the flexural element 42 tends to move toward the front wall 34a of the head (i.e., in the direction of arrow F, shown in FIG. 2) in response to pressure applied to the strap 36 in a direction opposite to the direction of insertion A. Thus, retraction pressure forces the strap teeth 46 against the head teeth 40 in the direction of arrow F. In other words, when a retraction force is applied to the strap 36, (e.g., a user, or the mere weight of the articles enclosed by the cable tie, attempts to pull the strap 36 downward back out through entry 38a, the applied force is transmitted to the flexural element 42, causing the pawl to move slightly forward (i.e. in the direction of arrow F) via the hinge 44, to bring the teeth 46 of the strap into tighter engagement with the teeth 40 of the head 34.

To further ensure locking engagement between the teeth 46 of the strap 36 and the teeth 40 of the head 34, the head can be provided with one or more stops 48 that prevent over-deflection of the strap. The stops 48 are formed as inward projections from the respective inner surfaces (i.e., the surfaces facing the aperture 38) of the side walls 34c, 34d of the head 34 for limiting the space available for the strap 36 to move away from the teeth 40 of the head to prevent slipping between the head and the strap.

More specifically, in one embodiment, as shown in FIGS. 2 and 3, the stops 48 are disposed one on either side of the flexural element 42, with a gap between the stops. The gap formed between the stops 48 has a dimension less than the width W of the strap 36 so that at least one stop will always engage the strap if the strap should fall out of engagement with the head teeth 40. The stops 48 and the teeth 40 of the head 34 also define a space that is slightly larger than the thickness T of the strap so as to allow insertion of the strap between the stops and the teeth, but also prevent more than a limited deflection of the strap away from the teeth in a direction opposite to the direction of force F applied by the flexural element 42.

Figure 4:
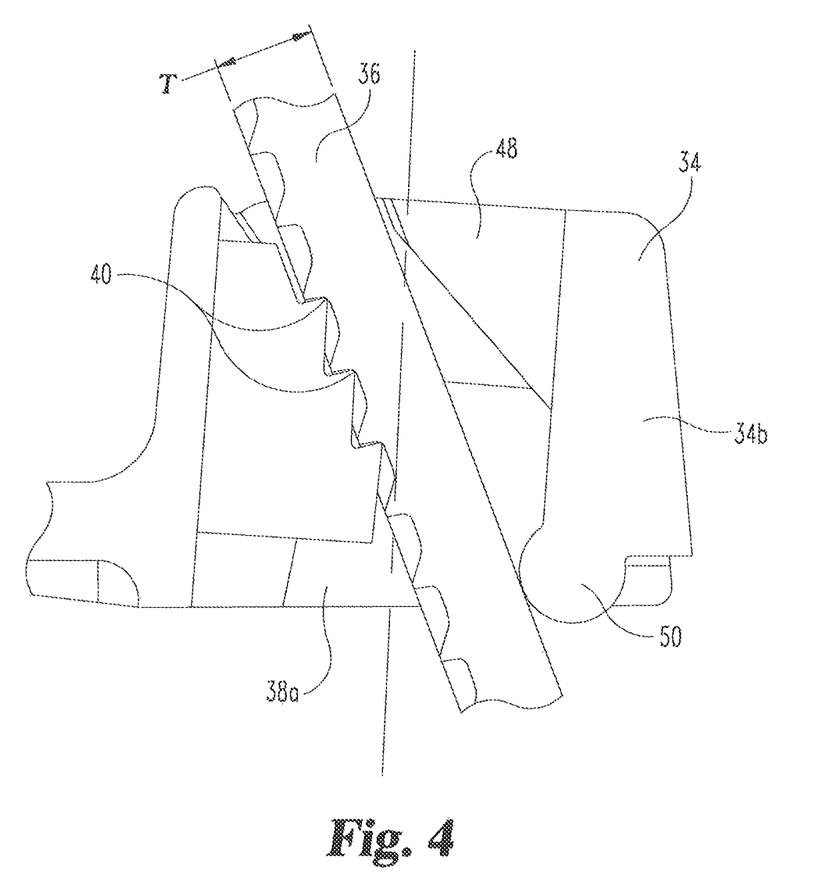
FIG. 4 is an enlarged isolated cross-sectional view of a locking mechanism formed in accordance with an alternative embodiment of the present invention.

In an alternative embodiment, as shown in FIG. 4, a combination of stops 48, 50 can be utilized to ensure engagement of the strap 36 with the teeth 40 of the head 34. Specifically, a second stop 50 is provided at the strap insertion end 38a of the aperture to also limit the amount of movement of the strap 36 away from the teeth 40 of the head 34. The second stop 50 may be formed as a rigid bulbuous projection formed on the rear wall 34b and extending partially into the aperture 38 formed by the head 34. The shape of this projection may vary and its length may extend the full length of the rear wall (in a direction into the plane of the drawing of FIG. 4) or may be only partially provided. The stops 50 and the teeth 40 of the head 34 also define a space at the strap insertion end 38a of the aperture.

However, in this case the space has a dimension that is slightly smaller than the thickness T of the strap so as to force engagement of the teeth of the strap against the teeth of the head. As can be seen in FIG. 4, the combination of the forward stop 50 and the rearward stop(s) causes the strap 36 to bend upon insertion into the aperture so that the strap's bending moment pushes it against the teeth 40 of the head 34.

Figure 5:
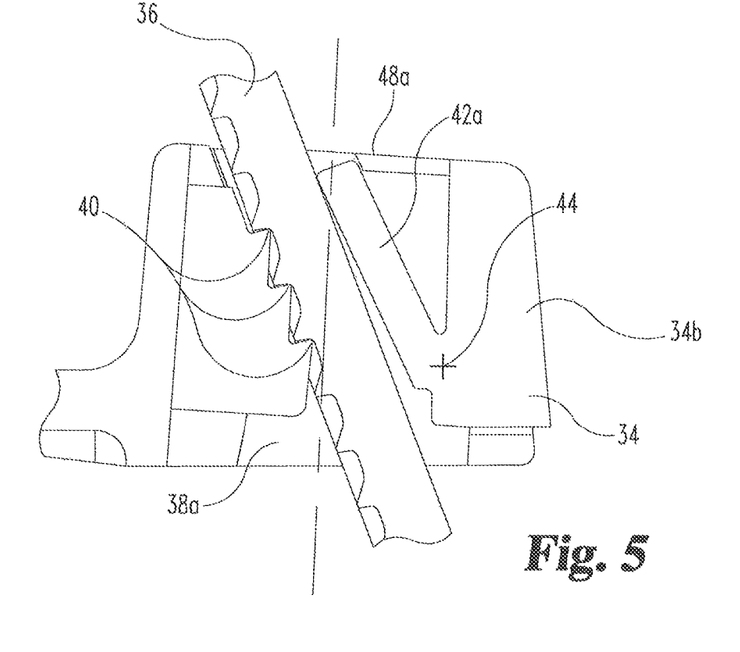
FIG. 5 is an enlarged isolated cross-sectional view of a locking mechanism formed in accordance with another alternative embodiment of the present invention.
Figure 6:
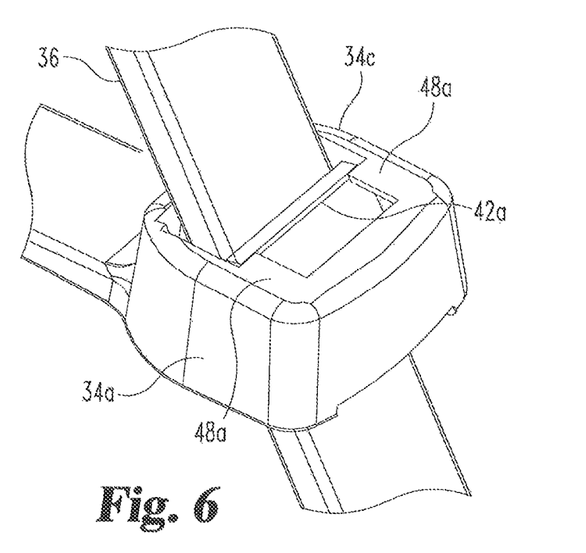
FIG. 6 is a top perspective view of the cable tie shown in FIG. 5.

In another alternative embodiment, as shown in FIGS. 5 and 6, the flexural element 42a is designed as a full length plate spanning the width of the aperture between the opposite side walls 34c, 34d Like the flexural element described above, the plate-shaped flexural element 42a is pivotable about a living hinge 44 formed on the rear wall 34b of the head 34 for biasing the strap 36 against the fixed teeth 40 formed on the front wall 34a of the head. In this embodiment, stops 48a are formed on the respective side walls 34c, 34d, as described above, but in this case, the stops act on the plate-shaped flexural element 42a to prevent over-deflection of the flexural element directly.

In all possible designs, the flexural element 42, 42a could be made of plastic, metal, inorganic reinforcements, or some combination of different plastics, metals, and reinforcements. For manufacturing, the head would ideally be able to be injection molded as one piece with the strap. That is, cable tie may be formed in such a manner that each of the parts thereof is integral with the parts adjacent thereto. However, it may be advantageous to use different materials for the strap and head. Additionally, certain geometries which provide high strength may not be easily injection moldable. In this case, the head or part of the head could be molded separately, allowing for more design freedom. For instance, the embodiment shown in FIGS. 5 and 6 would be desirably molded separately due to the large undercuts.

An injection molding process may include steps such as the following: providing a mold by combining multiple, e.g., two, mold parts to define a mold cavity for forming the cable tie; injecting molding material into the mold cavity to form the cable tie; solidifying the injected molding material to solidify the cable tie; separating the mold parts to open the mold; removing the solidified cable tie from the opened mold, e.g., ejecting the cable tie at a suitable ejection speed. Suitable injection molding processes, and the details thereof, would be understood by one of ordinary sill in the art.

The cable tie of the present invention will be strong enough to match the strap strength of glass fiber reinforced cable ties without damaging the glass fibers. The locking mechanism has increased strength with respect to current single piece ties. A greater area of the locking mechanism is placed in stress under load leading to lower local stresses for the same load. The locking mechanism could be of the same material as the strap. The entire cable tie could be injection moldable in one step, reducing manufacturing cost.

It is conceivable that, in other embodiments, the cable tie could have: a different number of teeth on the head; non-uniform tooth spacing in the head; a modification of the contact angle of the teeth; a modification of the curve on which the teeth lie.

Also the cable tie 100 may be formed of a suitable, e.g., plastic, material, e.g., nylon. The material of formation is preferably sufficiently flexible to accommodate the deformation to which the parts of cable tie are subject during use of cable tie, as described herein. In accordance with some embodiments, cable tie is made of PA66 (Nylon 6.6). In accordance with various embodiments, the material of formation of cable tie may be any of various colors, may be heat resistant, and/or may be UV resistant, e.g., for outdoor use.

Different thermoplastic materials could be used, (e.g., PA, POM, PBT, ETFE, PP, etc.). Thus, suitable base plastics include, but are not limited to, polyamide (e.g., nylon), polypropylene, polycarbonate, poly(ethylene tetrafluoroethylene), polyetheretherketone, poly(ethylene and chlorotrifluoroethylene), polyvinyl chloride, polyimide, polysulfone, and combinations of two or more thereof. Suitable base plastic materials may also include thermosets. In one embodiment, the base plastic is polypropylene. In one embodiment, the base plastic is polyamide. In one embodiment, the base plastic is polyamide 6 (i.e., nylon 6). In one embodiment, the base plastic is polyamide 6,6 (i.e., nylon 6,6). In one embodiment, base plastic is polyamide 6,6 loaded at between about 90-100 phr. In one embodiment, polyamide 6,6 is loaded at about 100 phr. In one embodiment, polyamide 6,6 loaded at about 100 phr is a medium impact modified compound with embedded process aid. In one embodiment, polyamide 6,6 loaded at about 100 phr is an unfilled resin with embedded process aid.

It should be apparent to those skilled in the art that the described embodiments of the present invention provided herein are illustrative only and not limiting, having been presented by way of example only. It should be further understood that the embodiments are not limited to the precise arrangements and configurations shown in the figures. The figures are not necessarily drawn to scale, and certain features may be shown exaggerated in scale or in generalized or schematic form, in the interest of clarity and conciseness.

As described herein, all features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. While various embodiments of the present invention are specifically illustrated and/or described herein, it will be appreciated that modifications and variations of the present invention may be effected by those skilled in the art without departing from the spirit and intended scope of the invention.

While various embodiments are described herein, it should be appreciated that the present invention encompasses many inventive concepts that may be embodied in a wide variety of contexts. The following detailed description of exemplary embodiments, read in conjunction with the accompanying drawings, is merely illustrative and is not to be taken as limiting the scope of the invention, as it would be impossible or impractical to include all of the possible embodiments and contexts of the invention in this disclosure. Upon reading this disclosure, many alternative embodiments of the present invention will be apparent to persons of ordinary skill in the art. The scope of the invention is defined by the appended claims and equivalents thereof.

With regard to terminology, the use of the term "preferable" or "preferably" is to be understood as indicating, inter alia, that the stated matter need not be as stated and that alternatives and contraries to the stated matter may obtain, unless indicated otherwise. The term "comprising" as may be used in the following claims is an open-ended transitional term that is intended to include additional elements not specifically recited in the claims. The term "consisting essentially of" as may be used in the following claims is a partially closed transitional phrase and is intended to include the recited elements plus any unspecified elements that do not materially affect the basic and novel characteristics of the claims. For example, the cable tie may be embossed or printed with indicia and still be included in the meaning of "consisting essentially of", even if not specifically recited. The term "consisting of" as may be used in the following claims is intended to indicate that the claims are restricted to the recited elements.

All documents, patents and other literature referred to herein are incorporated by reference in their entirety It should be noted that it is envisioned that any feature, element or limitation that is positively identified in this document may also be specifically excluded as a feature, element or limitation of an embodiment of the present invention.

What is claimed is:

1. A cable tie comprising:
   a flexible elongate strap; and
   a head attached to a first end of said strap, said head having a front wall, side walls and a rear wall defining an aperture, said front wall having at least one fixed tooth thereon and said rear wall having a flexural element thereon opposite said at least one fixed tooth, wherein said at least one fixed tooth and said flexural element are configured to permit a second end of said strap opposite said head to be inserted through said head aperture in a first direction and being further configured to prevent movement of said second end of said strap from said head aperture in a second direction opposite said first direction, wherein said head further comprises at least one stop projecting into said aperture that engages said flexural element to prevent said strap from disengaging from said at least one tooth on said head.

2. A cable tie as defined in claim 1, wherein said flexural element is toothless.

3. A cable tie as defined in claim 1, wherein said flexural element comprises a beam or plate pivotably attached to said rear wall about a living hinge integrally formed on said rear wall.

4. A cable tie as defined in claim 1, wherein said flexural element is a solid projection from the head which prevents the free end of the strap from being pushed away from the at least one tooth.

5. A cable tie as defined in claim 1, wherein said flexural element is a leaf spring made from a material different than said head.

6. A cable tie as defined in claim 5, wherein said leaf spring comprises a metal material.

7. A cable tie as defined in claim 1, wherein said head is molded separately from the strap and attached either during manufacturing or by the user.

8. A cable tie as defined in claim 1, wherein a continuous fiber reinforcement is molded within at least one of said strap and said head.

9. A cable tie as defined in claim 8, wherein said continuous fiber reinforcement is disposed continuously along a specific load path of at least one of said strap and said head.

10. A cable tie comprising:
    a flexible elongate strap; and
    a head attached to a first end of said strap, said head including a front wall, side walls and a rear wall defining an aperture having an entrance and an exit, said front wall having at least one fixed tooth thereon and said rear wall having a first stop at said entrance of said aperture and a second stop at said exit of said aperture, wherein said at least one fixed tooth and said first and second stops are configured to permit a second end of said strap opposite said head to be inserted through said head aperture in a first direction and being further configured to prevent movement of said second end of said strap from said head aperture in a second direction opposite said first direction, wherein said first stop projects into said aperture and engages said strap to force said strap into engagement with said at least one tooth.

11. A cable tie as defined in claim 10, wherein said second stop is a bulbous projection extending into said aperture.

12. A cable tie as defined in claim 10, wherein a continuous fiber reinforcement is molded within at least one of said strap and said head.

13. A cable tie as defined in claim 12, wherein said continuous fiber reinforcement is disposed continuously along a specific load path of at least one of said strap and said head.

* * * * *